(12) United States Patent
Shibukawa et al.

(10) Patent No.: US 8,646,577 B2
(45) Date of Patent: Feb. 11, 2014

(54) TRAVEL ASSEMBLY

(75) Inventors: Takeshi Shibukawa, Tsuchiura (JP);
Hayato Masuda, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 981 days.

(21) Appl. No.: 12/615,562

(22) Filed: Nov. 10, 2009

(65) Prior Publication Data

US 2010/0119184 A1    May 13, 2010

(30) Foreign Application Priority Data

Nov. 12, 2008   (JP) ................................ 2008-289860

(51) Int. Cl.
*F01M 1/06*      (2006.01)
*F16C 33/66*    (2006.01)

(52) U.S. Cl.
USPC ........................................... 184/7.1; 384/462

(58) Field of Classification Search
USPC .................. 184/5.1, 7.1; 384/462, 471, 475
See application file for complete search history.

(56) References Cited

U.S. PATENT DOCUMENTS

| | | | | |
|---|---|---|---|---|
| 6,640,933 | B2 * | 11/2003 | Henry et al. | 184/5.1 |
| 7,374,019 | B2 * | 5/2008 | Kosugi et al. | 184/6.14 |
| 2003/0010572 | A1 * | 1/2003 | Henry et al. | 184/5.1 |
| 2004/0065169 | A1 | 4/2004 | Ciszak et al. | |
| 2005/0252722 | A1 * | 11/2005 | Kosugi et al. | 184/5.1 |
| 2007/0177835 | A1 * | 8/2007 | Verhaegen | 384/462 |
| 2008/0093175 | A1 * | 4/2008 | Yanohara et al. | 184/7.1 |

* cited by examiner

*Primary Examiner* — William E Dondero
*Assistant Examiner* — Robert T Reese
(74) *Attorney, Agent, or Firm* — Crowell & Moring LLP (57) ABSTRACT

A travel assembly is provided with a cylindrical spindle for being fixed on a body of a working vehicle, a rotary shaft arranged extending in an axial direction through the spindle and rotationally drivable by a driving source, a rim rotatably arranged on a side of an outer periphery of the spindle to permit mounting of a wheel thereon, a planetary gear reduction mechanism for transmitting rotation of the rotary shaft to the rim at a reduced speed, a bearing rotatably supporting the rotary shaft via a sleeve integrally fitted on the rotary shaft, and a retainer holding the bearing in place. A lube oil pipe for feeding lube oil to the rotary shaft is held in place by the retainer. The lube oil pipe branches within the retainer to form an oil passage. The oil passage has an opening through which the lube oil can be fed to rolling elements in the bearing.

4 Claims, 8 Drawing Sheets

TRAVEL ASSEMBLY

CROSS-REFERENCE TO RELATED APPLICATION

This application claims the priority of Japanese Patent Application 2008-289860 filed Nov. 12, 2008, which is incorporated herein by reference.

BACKGROUND OF THE INVENTION

1. Field of the Invention

This invention relates to a travel assembly, which is to be arranged on a wheeled working vehicle such as a dump truck for transporting, for example, crushed rocks dug in a mine or the like, and has a travel motor and a planetary gear reduction mechanism for transmitting rotation of a rotary shaft of the travel motor to a wheel at a reduced speed.

2. Description of the Related Art

In general, drive assemblies for driving drive wheels of a wheeled working vehicle, for example, a dump truck to travel are each provided with a cylindrical spindle to be mounted on a vehicle body, a rotary shaft arranged extending in an axial direction through the spindle and rotationally drivable by a driving source such as an electric motor, a rim rotatably arranged on an outer periphery of a free end portion of the spindle via a bearing to permit mounting of a wheel on the rim, and a multiple-stage, planetary gear reduction mechanism for transmitting rotation of the rotary shaft to the rim at a reduced speed.

The planetary gear reduction mechanism transmits a rotation output from the driving source composed, for example, of the electric motor to the wheel via the rim at a reduced speed, so that a rotary torque is produced at the drive wheel of the vehicle, such as a front wheel or rear wheel, to cause the dump truck to travel.

In a conventional technology disclosed in U.S. Patent Application Publication No. 2004/0065169 A1, two sets of planetary gear reduction mechanisms are included for increasing rotary torque in a vehicle and composed of a sun gear, plural planet gears, a ring gear, a carrier, and the like, respectively. Each planetary gear reduction mechanism is constructed such that the carrier rotatably supports the plural planet gears, which are rotatable in accordance with rotation of the sun gear, via plural support pins and rotation of the respective planet gears are transmitted to the ring gear and are outputted as a rotation output to an outside. On the other hand, the rotary shaft is rotatably supported by a bearing arranged at an intermediate location in a longitudinal direction from a motor to the planetary gear reduction mechanism.

In the conventional technology disclosed in the above-mentioned U.S. Patent Application Publication No. 2004/0065169 A1, however, large rotational loads are applied to each travel assembly in such a dump truck, and therefore, it is necessary to feed lube oil to the rotary shaft and bearing to maintain them under lubrication.

In the above-described construction, however, holding of a great deal of lube oil within the travel assembly results in energy loss and heat production due to resistance to agitation of the lube oil as a result of rotation of the respective gears. It is, therefore, common to set the quantity of lube oil, which is to be held within the travel assembly, at a minimum need (for example, approximately from ⅕ to ⅓ of the internal capacity). When set so, the oil level is located on a side lower than the rotary shaft so that only the planet gears and the carrier supporting the planet gears thereon are immersed in the lube oil and the rotary shaft and its bearing remain free from immersion in the lube oil.

In the conventional technology disclosed in U.S. Patent Application Publication No. 2004/0065169 A1, the bearing that rotatably supports the rotary shaft thereon is arranged in proximity to the planet gears in expectation of lubrication with lube oil mist splashed as a result of rotation of the planet gears.

The conventional technology disclosed in U.S. Patent Application Publication No. 2004/0065169 A1, however, involves a potential problem that the lube oil may not be fed in any sufficient quantity to the bearing for the rotary shaft because the lube oil for lubricating the bearing, which rotatably supports the rotary shaft thereon, is fed only by a method that relies upon dispersion of lube oil mist as a result of splashing of the lube oil by rotation of the planet gears. A failure to feed the lube oil in a sufficient quantity is accompanied by a problem that the bearing is reduced in durability and service life.

SUMMARY OF THE INVENTION

With the above-mentioned problem of the conventional technology in view, the present invention has as an object thereof the provision of a travel assembly that can feed a sufficient quantity of lube oil to a bearing for a rotary shaft.

To achieve the above-described object, the present invention provides, in one aspect thereof, a travel assembly provided with a cylindrical spindle for being fixed on a body of a working vehicle, a rotary shaft arranged extending in an axial direction through the spindle and rotationally drivable by a driving source, a rim rotatably arranged on a side of an outer periphery of the spindle to permit mounting of a wheel thereon, a planetary gear reduction mechanism for transmitting rotation of the rotary shaft to the rim at a reduced speed, a bearing rotatably supporting the rotary shaft via a sleeve integrally fitted on the rotary shaft, and a retainer holding the bearing in place, wherein a lube oil pipe for feeding lube oil to the rotary shaft is held in place by the retainer, the lube oil pipe branches within the retainer to form an oil passage, and the oil passage has an opening through which the lube oil can be fed to rolling elements in the bearing.

In the present invention constituted as described above, within the retainer that holds in place the bearing with the rotary shaft rotatably supported thereon and that also holds in place the lube oil pipe through which the lube oil is forced to circulate, the lube oil is fed to the oil passage formed by branching the lube oil pipe and is then fed through a shortest distance from the opening of the oil passage to the rolling elements in the bearing for the rotary shaft. The bearing can, therefore, be improved in durability and service life by surely feeding a sufficient quantity of the lube oil to the rolling elements in the bearing as described above.

In the travel assembly according to the present invention, the retainer and sleeve may preferably be provided, on a side of the driving source, with flange portions, respectively, and the flange portions may preferably extend opposite each other such that the flange portions shield the rolling elements in the bearing. According to the present invention constituted as described above, a gap between the retainer and the sleeve can be reduced compared with an embodiment not provided with such flange portions, and therefore, the lube oil fed through the opening of the oil passage can be restrained from flowing out past the rolling elements and reaching the motor. Accordingly, it is possible to avoid contamination of motor oil.

In the travel assembly according to the present invention, the oil passage may preferably have, on a side of the rolling elements in the bearing, the opening in the flange portion arranged on the retainer. Different from an embodiment in which the opening of such an oil passage is not arranged in the flange portion arranged on the retainer, in other words, an embodiment in which the bearing is provided with such an opening, the present invention constituted as described above does not require machining that would otherwise be needed to form such an oil passage in the bearing, and therefore, can use a general-purpose bearing as the bearing.

In the travel assembly according to the present invention, the flange portions of the retainer and sleeve may preferably overlap with each other at end portions thereof. In the present invention constituted as described above, the gap between the retainer and the sleeve takes a labyrinth form. The lube oil fed through the opening of the oil passage can, therefore, be prevented from flowing out past the rolling elements and reaching the motor. Accordingly, it is possible to surely avoid contamination of motor oil.

In the travel assembly according to the present invention, the oil passage may preferably comprise a through-hole extending from an outer periphery of the retainer to an inner periphery of the retainer, intersecting with the lube oil pipe, and being closed up at an opening thereof on a side of the outer periphery of the retainer. According to the present invention constituted as described above, hole drilling is feasible from the outer periphery of the retainer, and therefore, the manufacture is easy compared with an embodiment in which such an oil passage is formed by hole drilling from an inner periphery of an annular retainer to a location where the oil passage intersects with the lube oil pipe.

In the travel assembly provided with the bearing rotatably supporting thereon the rotary shaft rotationally drivable by the driving source and also with the retainer holding the bearing in place, the lube oil pipe for feeding lube oil to the rotary shaft is held in place by the retainer, and the oil passage branching out from the lube oil pipe within the retainer has the opening through which lube oil can be fed through a shortest distance to the rolling elements in the bearing. Therefore, the present invention can surely feed a sufficient quantity of the lube oil to the rolling elements in the bearing. As a consequence, fresh lube oil can be continuously fed to the rolling elements in the bearing, and therefore, the bearing, that is, the travel assembly can be provided with durability and service life improved over those of the conventional technology.

DETAILED DESCRIPTION OF PREFERRED EMBODIMENTS

Best embodiments for practicing the travel assembly according to the present invention will hereinafter be described based on the accompanying drawings.

First Embodiment

Referring first to FIGS. 1 through 5, a travel assembly according to a first embodiment of the present invention will be described.

Figure 1:
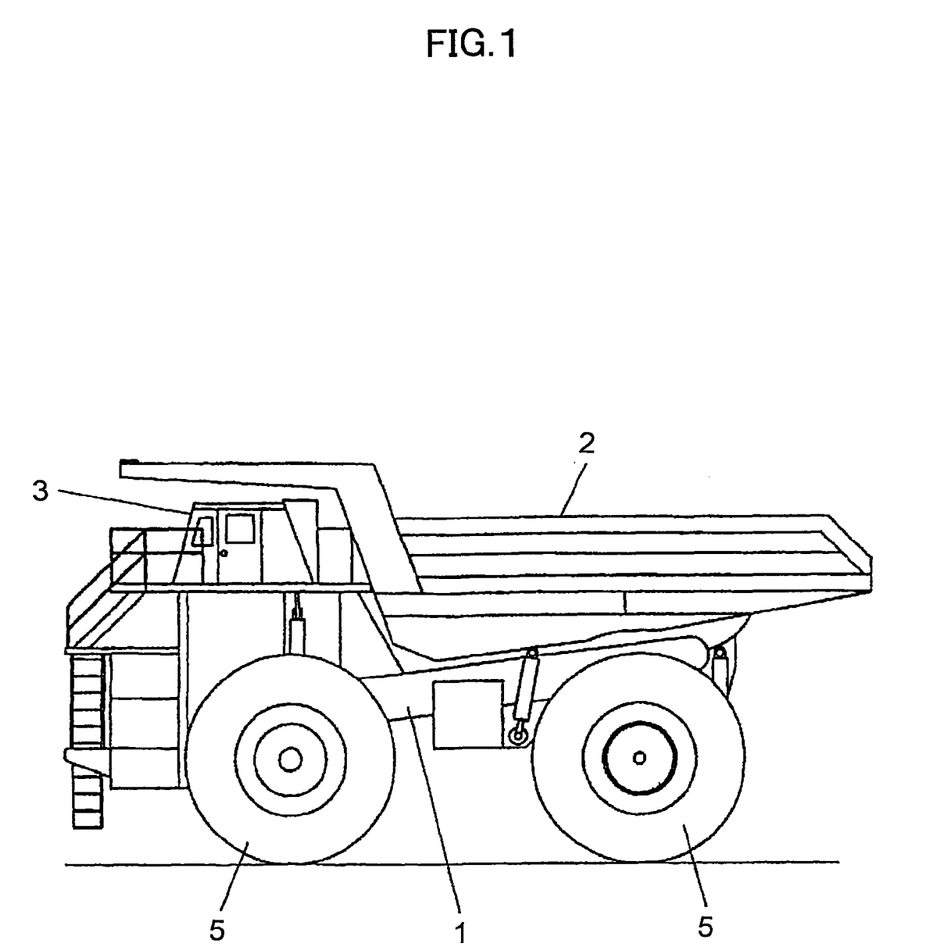
FIG. 1 is a side view showing a dump truck equipped with travel assemblies according to a first embodiment of the present invention.
Figure 2:
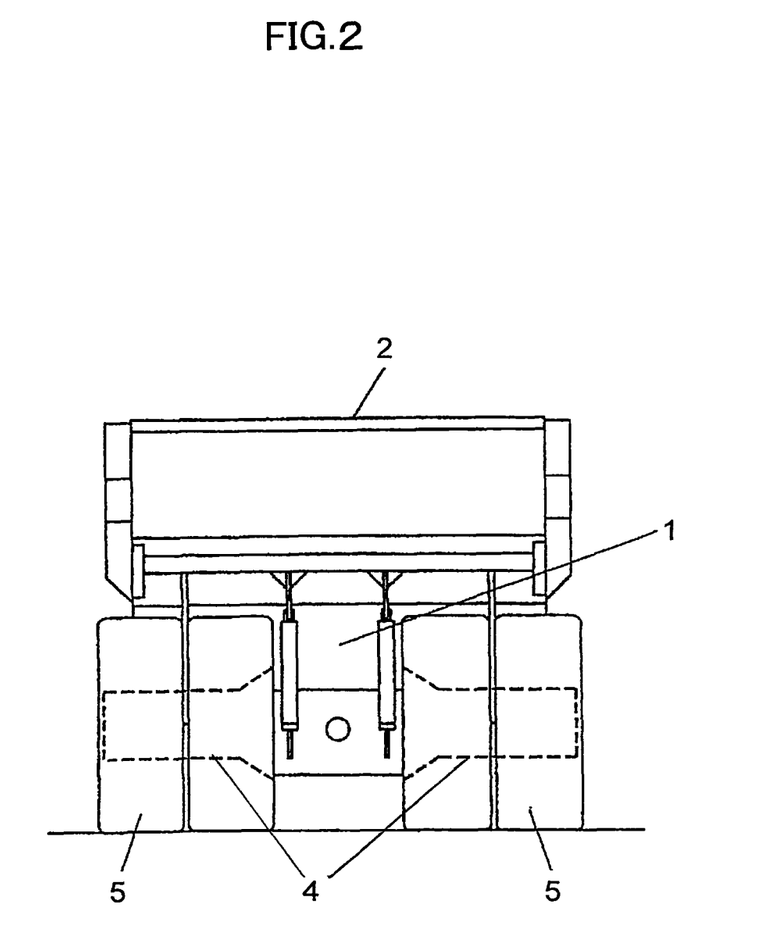
FIG. 2 is a rear view of the dump truck shown in FIG. 1.

As shown in FIGS. 1 and 2, a wheeled vehicle on which travel assemblies according to a first embodiment of the present invention are arranged, for example, a mining dump truck is provided with a frame structure chassis 1, a vessel 2 tiltably mounted as a load body on the chassis 1, a cab 3 arranged on a front side of the chassis 1, and plural wheels 5. As illustrated in FIG. 2, a travel assembly 4 according to the first embodiment is arranged on a rear part of the chassis 1, and rotationally drives a rear wheel out of the wheels 5.

Figure 3:
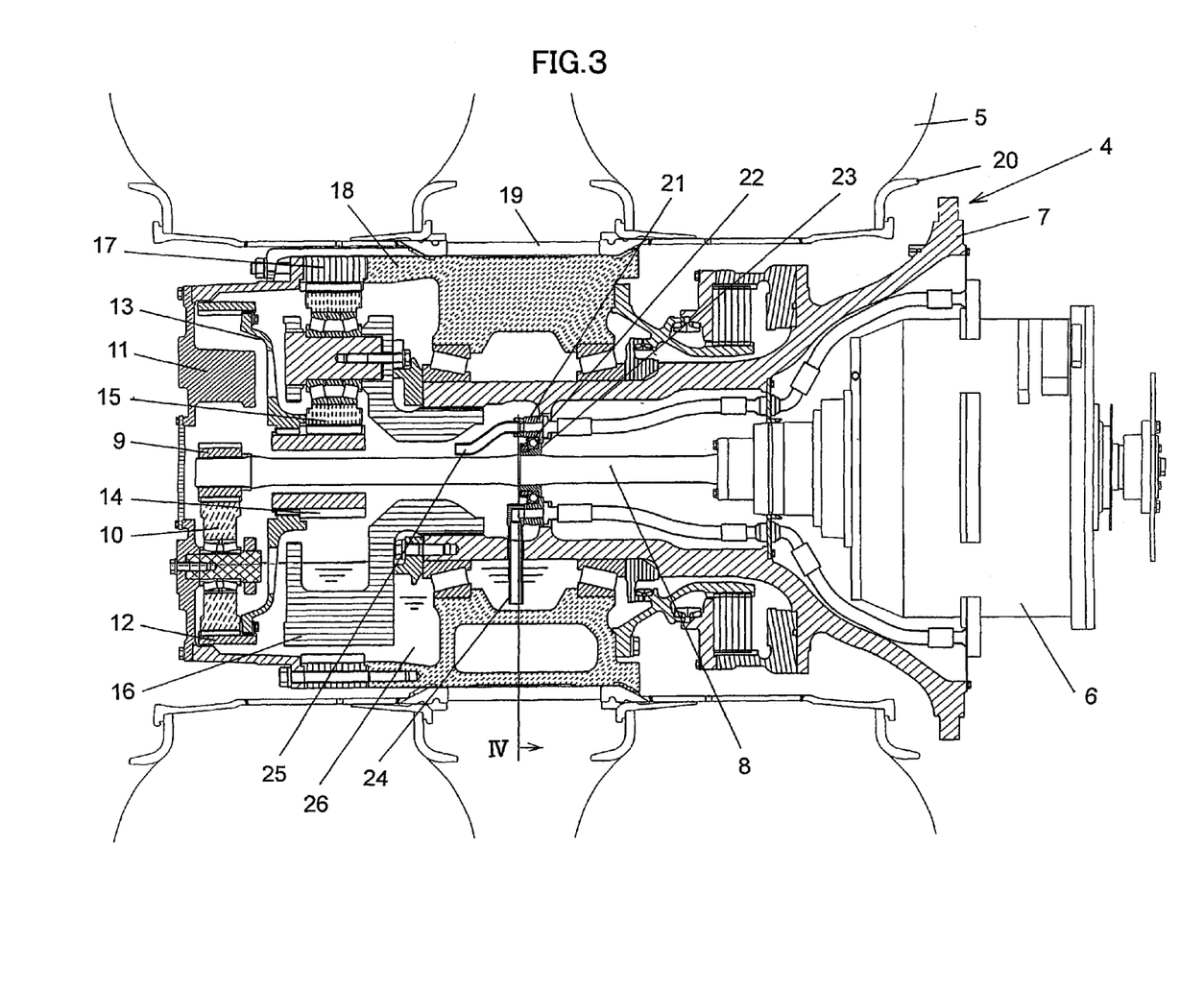
FIG. 3 is a fragmentary cross-sectional view illustrating one of the travel assemblies according to the first embodiment of the present invention.

As depicted in FIG. 3, the travel assembly 4 according to the first embodiment is provided with an electric motor 6 as a driving source and a cylindrical spindle 7 that fixedly secures the electric motor 6 on the chassis 1 shown in FIGS. 1 and 2. A sun gear 9 is arranged on a free end portion of a rotary shaft 8 of the electric motor 6, and a bearing 22 is arranged corresponding to a substantially central portion of the rotary shaft 8. The bearing 22 is supported on the spindle 7 by a retainer 21. The travel assembly 4 is also provided with a suction-side lube oil pipe 24 and a delivery-side lube oil pipe 25, which serve to circulate lube oil 26 held in the travel assembly 4. The travel assembly 4 is further provided with a carrier 11 rotatably supporting the planet gears 10 thereon, a sun gear 14 integrated via a gear coupling 13 with a ring gear 12 meshing with the planet gears 10, planet gears 15 meshing with the sun gear 14, and a carrier 16 rotatably supporting the planet gears 15 thereon. The travel assembly 4 is still further provided with a drum 18 to which rotation of the electric motor 6 is finally transmitted, and rims 20 carrying tires of the wheel 5 integrally mounted thereon and fixedly secured on the drum 18 via a spacer 19.

Figure 4:
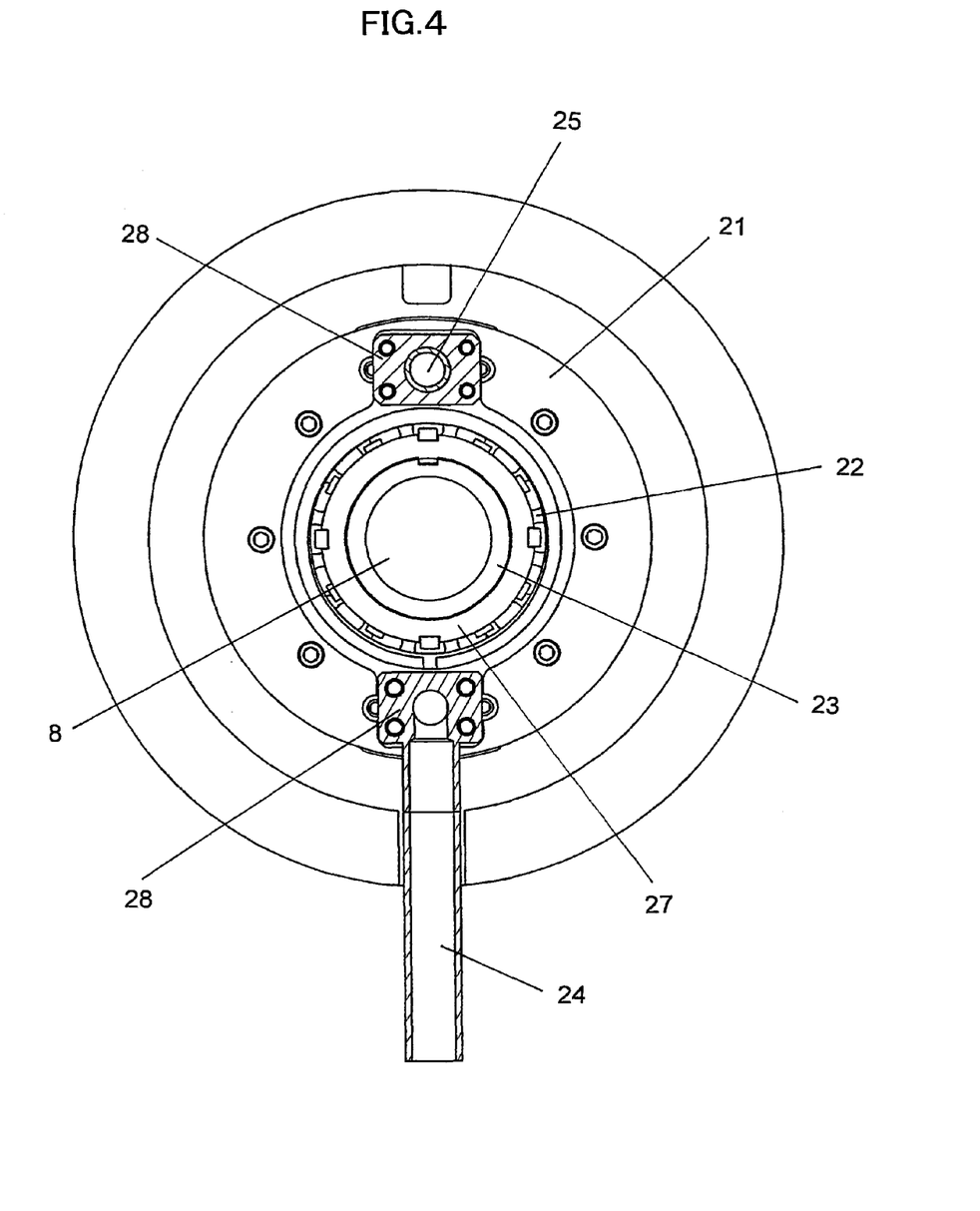
FIG. 4 is an enlarged cross-sectional view taken in a direction of arrow IV of FIG. 3.

In the travel assembly 4 according to the first embodiment, the rotary shaft 8 is rotatably supported on the bearing 22 via a sleeve 23 fitted on the rotary shaft 8 as shown in FIG. 4. The suction-side lube oil pipe 24 and delivery-side lube oil pipe 25 are fixed on the retainer 21 by flanges 28, respectively.

Figure 5:
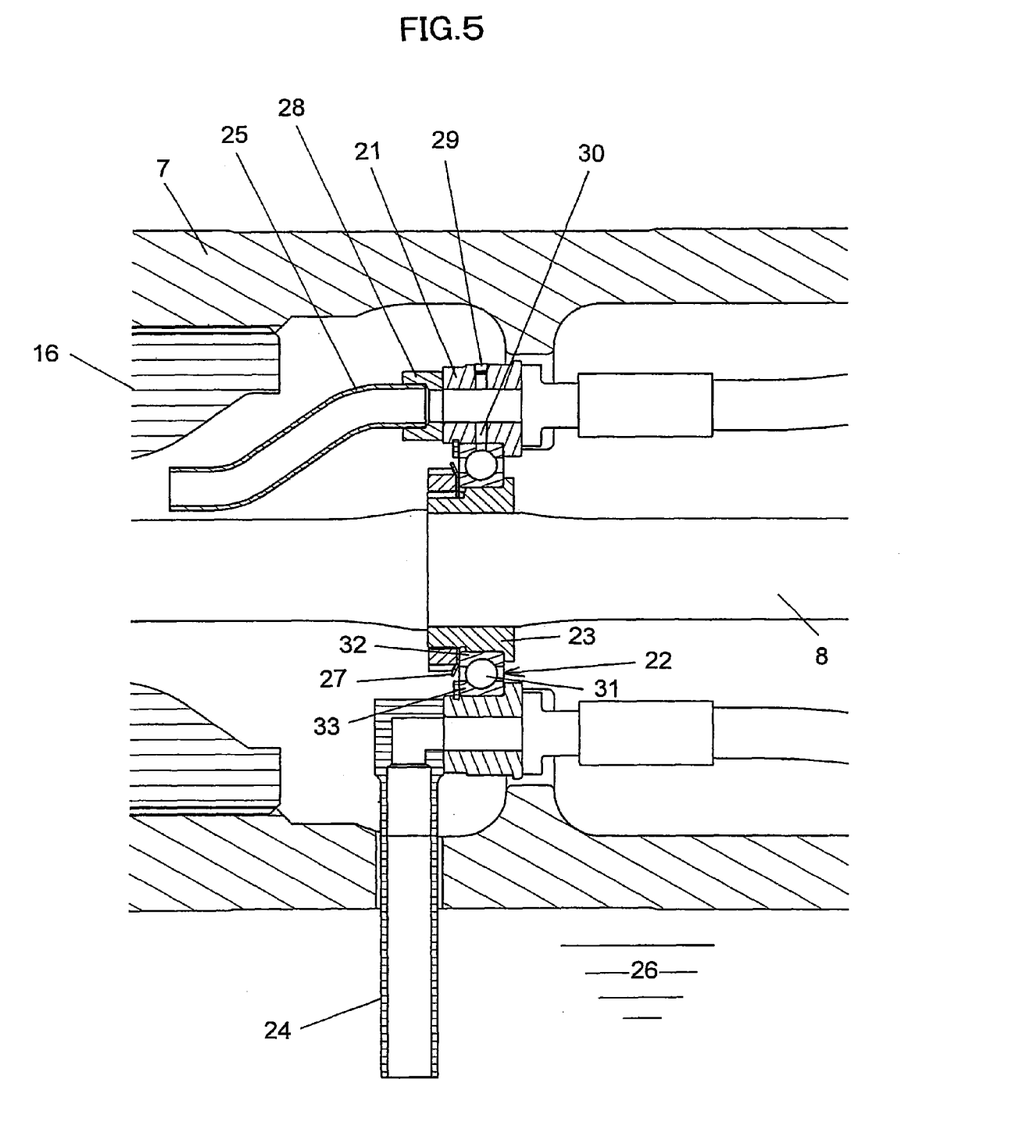
FIG. 5 is a fragmentary, side cross-sectional view corresponding to FIG. 4, and depicts a supporting bearing section.

In the travel assembly 4 according to the first embodiment, the bearing 22 is composed of rolling elements 31, an inner race 32 and an outer race 33 as shown in FIG. 5. The outer race 33 that holds these rolling elements 31 in place is supported by the retainer 21. Further, the sleeve 23 is fixed relative to the inner race 32 of the bearing 22 by an anti-rotation washer 27 and an unillustrated nut.

In this first embodiment, an oil passage 30 is arranged, as illustrated in FIG. 5, by arranging a through-hole in the retainer 21 and outer race 33 such that the through-hole intersects with the delivery-side lube oil pipe 25, and an opening of the oil passage 30, said opening being on a side of an outer periphery of the retainer 21, is closed up by a plug 29. In other words, the oil passage 30 branches out from the delivery-side lube oil pipe 25 within the retainer 21, and has an opening through which lube oil can be fed to the rolling elements 31 in the bearing 22.

In the first embodiment constituted as described above, the electric motor 6 drives the sun gear 9 by way of the rotary shaft 8. The sun gear 9 then drives the planet gears 10, and their driving power is transmitted to the ring gear 12 and then drives the sun gear 14 and planet gears 15 via the gear coupling 13. The planet gears 15 drive a ring gear 17, and its driving power is transmitted to the wheels 5 via the drum 18 and spacer 19. As has been described above, the rotation of the electric motor 6 is reduced in speed but is increased in torque by the sun gears 9,14, planet gears 10,15 and ring gears 12,17, and by rotation of the wheels 5 which have acquired the resulting large torque, the dump truck is allowed to travel.

In the travel assembly 4 according to the first embodiment, the lube oil 26 held in the travel assembly 4 is circulated through the suction-side lube oil pipe 24 and delivery-side lube oil pipe 25 as mentioned above. The circulation is forcedly performed by an unillustrated pump, and a portion of the lube oil 26 is fed to the bearing 22 through the oil passage 30 branching out from the delivery-side lube oil pipe 25.

It is to be noted that, because the oil passage 30 is also formed in the outer race 33 of the bearing 22, the lube oil 26 is surely fed over a shortest distance to the rolling elements 31 in the bearing 22 and lubricates the rolling elements 31. Subsequently, the lube oil 26 is discharged through clearances between the rolling elements 31 and the inner race 32 and outer race 33, and is again drawn and circulated through the suction-side lube oil pipe 24.

According to the first embodiment constituted as described above, the bearing 22 can be arranged corresponding to a substantially central portion of the rotary shaft 8, at which decentering of the rotary shaft 8 becomes greatest, and therefore, the rotational speed that permits safe rotation can be increased. In addition, the oil passage 30 branches out within the retainer 21 at a location just proximal to the bearing 22. It is, therefore, possible to surely feed a sufficient quantity of the lube oil 26 to the rolling elements 31 in the bearing 22 through a shortest distance via the opening of the oil passage 30 and to provide the bearing 22 with improved lubricity and hence with improved durability and service life.

Further, the retainer 21 is an annular member. Although machining can be applied to form the oil passage 30 only from a side of its inner periphery to the location at which the oil passage 30 branches out from the delivery-side lube oil pipe 25, hole drilling from the side of the inner periphery of the retainer 21 toward its outer periphery requires a special tool, and therefore, incurs an increase in machining cost. According to the first embodiment, hole drilling is easy owing to the adoption of the structure that a through-hole is formed by hole drilling from the side of the outer periphery of the retainer 21 and is then closed up by the plug 29 on the side of the outer periphery of the retainer 21.

Second Embodiment

Figure 6:
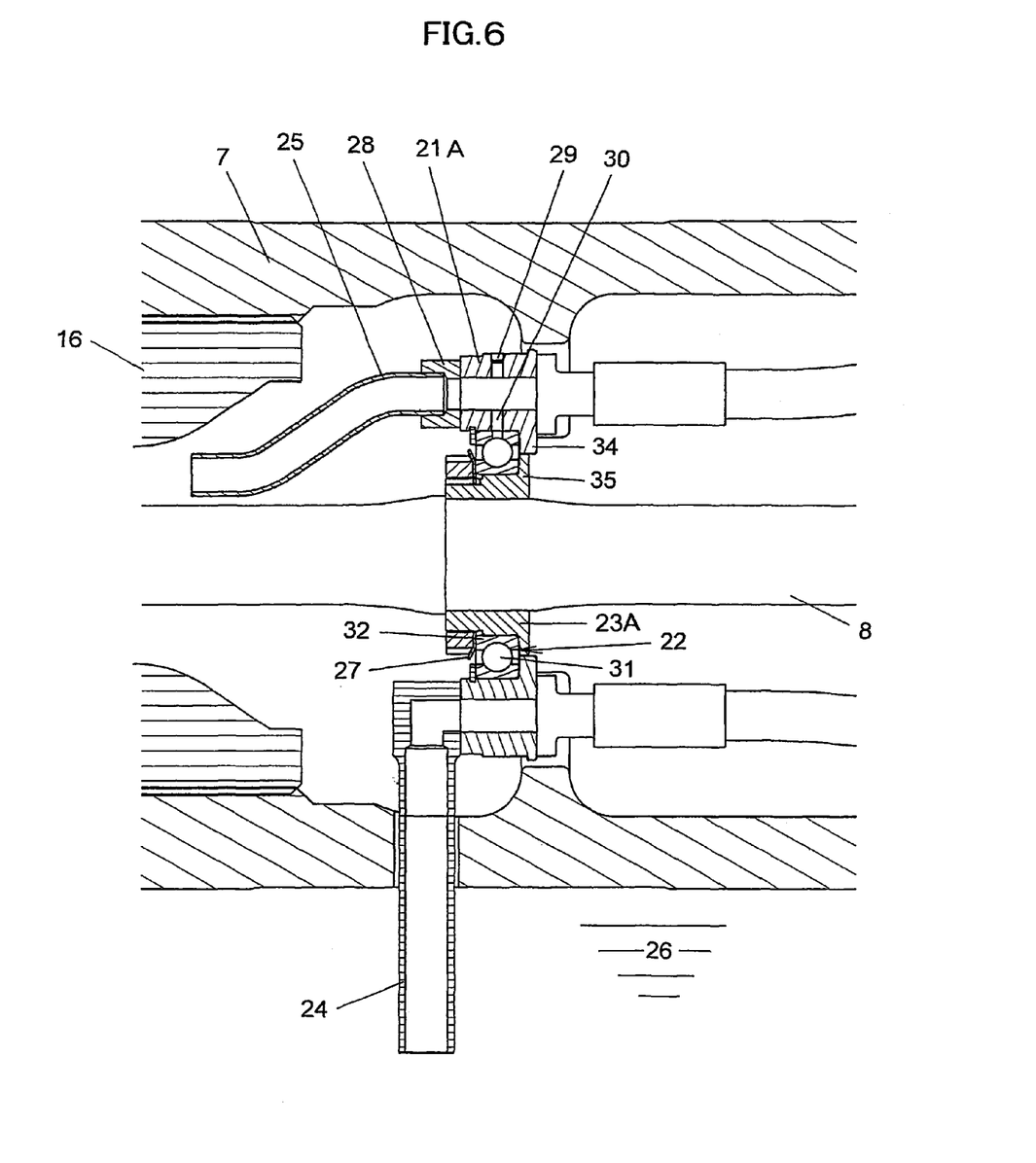
FIG. 6 is a fragmentary, side cross-sectional view similar to FIG. 5, and shows a travel assembly according to a second embodiment of the present invention.

Referring next to FIG. 6, a travel assembly according to a second embodiment of the present invention will be described.

In this second embodiment, a retainer 21A and a sleeve 23A are provided, on a side of the electric motor 6, with a retainer-side flange portion 34 and a sleeve-side flange portion 35, respectively, and these flange portions 34,35 extend opposite each other such that the flange portions 34,35 shield the rolling elements 31 in the bearing 22. It is to be noted that the remaining construction including the oil passage 30 is equivalent to the corresponding construction in the above-described first embodiment.

In the second embodiment constituted as described above, a portion of the lube oil 26 is also fed to the bearing 22 through the oil passage 30 branching out from the delivery-side lube oil pipe 25, and the oil passage 30 is also formed in the outer race 33 of the bearing 22. Therefore, the lube oil 26 is fed to the rolling elements 31 in the bearing 22, and lubricates the rolling elements 31. Similar to the first embodiment, it is hence possible to surely feed a sufficient quantity of the lube oil 26 to the rolling elements 31 in the bearing 22 through a shortest distance via the opening of the oil passage 30 and to provide the bearing 22 with improved durability and service life.

In the second embodiment, it is also possible to restrain the lube oil 26 from flowing out past the rolling elements 31, reaching the electric motor 6 and contaminating motor oil in the electric motor 6 by the retainer-side flange portion 34 and sleeve-side flange portion 35 extending such that they shield the rolling elements 31.

Third Embodiment

Figure 7:
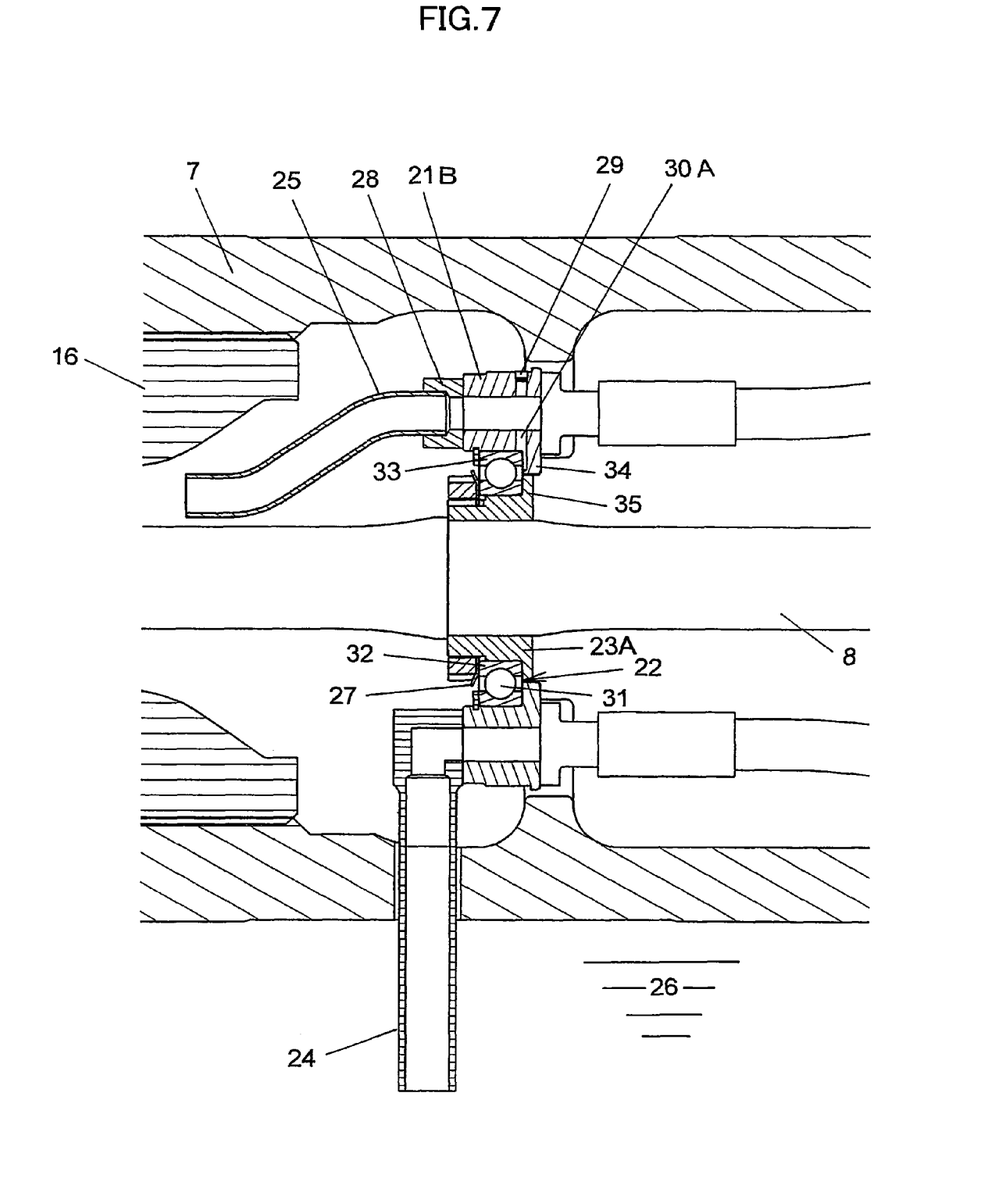
FIG. 7 is a fragmentary, side cross-sectional view similar to FIG. 5, and depicts a travel assembly according to a third embodiment of the present invention.

Referring next to FIG. 7, a travel assembly according to a third embodiment of the present invention will be described.

In this third embodiment, a retainer 21B and the sleeve 23A are provided, on a side of the electric motor 6, with the retainer-side flange portion 34 and the sleeve-side flange portion 35, respectively, and these flange portions 34,35 extend opposite each other such that the flange portions 34,35 shield the rolling elements 31 in the bearing 22. It is to be noted that in the retainer 21B, an oil passage 30A is not formed in the outer race 33 of the bearing 22 but is formed in the retainer-side flange portion 34 on a side of the rolling elements 31. As an opening of the oil passage 30A, a clearance existing in a side wall of the bearing 22 on a side opposite the electric motor 6 is used. The remaining construction is equivalent to the corresponding construction in the above-described second embodiment.

In the third embodiment constituted as described above, a portion of the lube oil 26 is also fed to the rolling elements 31 in the bearing 22 through the clearance in the side wall of the bearing 22 by way of the oil passage 30A branching out from the delivery-side lube oil pipe 25, and lubricates the rolling elements 31. Similar to the first embodiment, it is hence possible to surely feed a sufficient quantity of the lube oil 26 to the rolling elements 31 in the bearing 22 through a shortest distance via the opening of the oil passage 30A and to provide the bearing 22 with improved durability and service life. In the third embodiment, it is also possible to restrain the lube oil 26 from flowing out past the rolling elements 31, reaching the electric motor 6 and contaminating motor oil in the electric motor 6 owing to the arrangement of the retainer-side flange portion 34 and sleeve-side flange portion 35 extending such that they shield the rolling elements 31.

Further, this third embodiment does not require such hole drilling as needed in the first and second embodiments for the arrangement of the oil passage 30 in the outer race 33 of the bearing 22, and can use, as the bearing 22, a general-purpose bearing as it is.

Fourth Embodiment

Figure 8:
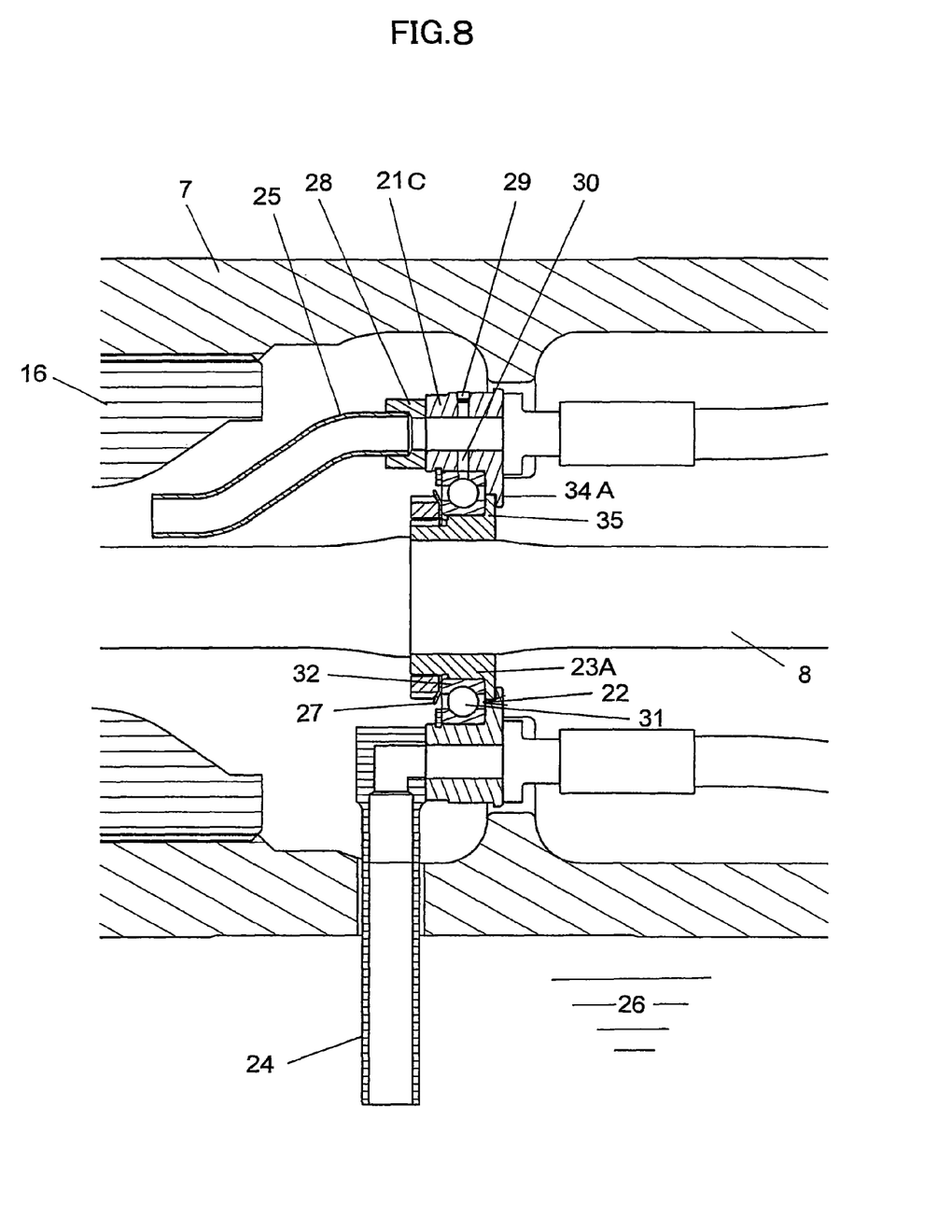
FIG. 8 is a fragmentary, side cross-sectional view similar to FIG. 5, and illustrates a travel assembly according to a fourth embodiment of the present invention.

Referring finally to FIG. 8, a travel assembly according to a fourth embodiment of the present invention will be described.

In this fourth embodiment, a retainer 21C and the sleeve 23A are provided, on a side of the electric motor 6, with a retainer-side flange portion 34A and the sleeve-side flange portion 35, respectively, and these flange portions 34A, 35 extend opposite each other such that the flange portions 34A, 35 shield the rolling elements 31 in the bearing 22. Of these flange portions 34A, 35, the retainer-side flange portion 34A is formed extending in a radially inward direction such that the respective flange portions 34A, 35 overlap with each other at end portions thereof. The remaining construction is equivalent to the corresponding construction in the above-described third embodiment.

In the fourth embodiment constituted as described above, a portion of the lube oil 26 is also fed to the rolling elements 31 through the opening in the outer race 33 by way of the oil passage 30 branching out from the delivery-side lube oil pipe 25, and lubricates the rolling elements 31. Similar to the first embodiment, it is hence possible to surely feed a sufficient quantity of the lube oil 26 to the rolling elements 31 in the bearing 22 through a shortest distance via the opening of the oil passage 30 and to provide the bearing 22 with improved durability and service life.

In the fourth embodiment, it is also possible to surely prevent the lube oil 26 from flowing out past the rolling elements 31, reaching the electric motor 6 and contaminating motor oil in the electric motor 6 owing to the mutually overlapping arrangement of the retainer-side flange portion 34A and sleeve-side flange portion 35 extending such that they shield the rolling elements 31.

The invention claimed is:

1. A travel assembly comprising:
    a cylindrical spindle that is fixed on a body of a working vehicle;
    a rotary shaft that extends in an axial direction through the cylindrical spindle, the rotary shaft being rotationally drivable by a driving source;
    a rim rotatably arranged on a side of an outer periphery of the cylindrical spindle to permit mounting of a wheel thereon;
    a planetary gear reduction mechanism configured to transmit rotation of the rotary shaft to the rim at a reduced speed;
    a sleeve integrally fitted on the shaft;
    a bearing rotatably supporting the rotary shaft via the sleeve, the sleeve being configured to extend in an axial direction over a radially inner side of the bearing;
    a retainer holding the bearing in place, the retainer being configured to extend in an axial direction over a radially outer side of the bearing; and
    a lube oil pipe configured to feed lube oil to the rotary shaft, the lube oil pipe being held in place by the retainer, wherein
        the lube oil pipe branches within the retainer to form an oil passage,
        the oil passage has an opening through which the lube oil is feedable to rolling elements in the bearing,
        the retainer and sleeve form flange portions, respectively, the flange portions being configured to extend radially from the respective retainer and sleeve toward one another in order to axially shield rolling elements in the bearing, the flange portions of the retainer and sleeve being provided on a side of the driving source, and
        the oil passage has, on a side of the rolling elements in the bearing, the opening in the flange portion arranged on the retainer.

2. The travel assembly according to claim 1, wherein the flange portions of the retainer and sleeve overlap with each other at end portions thereof.

3. The travel assembly according to claim 1, wherein the oil passage comprises a through-hole extending from an outer periphery of the retainer to an inner periphery of the retainer, intersecting with the lube oil pipe, and being closed up at an opening thereof on a side of the outer periphery of the retainer.

4. The travel assembly according to claim 1, wherein
    the oil passage is formed by an opening in the retainer, such that an entirety of the oil passage is enclosed within the retainer, and
    the oil passage is directly connected at a first end thereof to the lube oil pipe and at a second end thereof to the bearing.

* * * * *